United States Patent
Li et al.

(10) Patent No.: US 8,625,758 B2
(45) Date of Patent: Jan. 7, 2014

(54) METHOD, A TELECOMMUNICATION SYSTEM AND A NETWORK NODE FOR SPONSORING A COMMUNICATION SERVICE

(75) Inventors: Xiangyang Li, Shanghai (CN); Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/381,412

(22) PCT Filed: Jun. 30, 2009

(86) PCT No.: PCT/CN2009/072569
§ 371 (c)(1),
(2), (4) Date: Dec. 29, 2011

(87) PCT Pub. No.: WO2011/000155
PCT Pub. Date: Jan. 6, 2011

(65) Prior Publication Data
US 2012/0106722 A1    May 3, 2012

(51) Int. Cl.
*H04M 15/00* (2006.01)
(52) U.S. Cl.
USPC ............ 379/114.21; 379/114.13; 379/114.23
(58) Field of Classification Search
USPC ................ 379/114.1, 114.12, 114.21, 114.23
See application file for complete search history.

(56) References Cited

U.S. PATENT DOCUMENTS

| | | | | |
|---|---|---|---|---|
| 5,381,467 | A * | 1/1995 | Rosinski et al. | 379/121.01 |
| 7,424,102 | B2 * | 9/2008 | Koskinen et al. | 379/114.22 |
| 2001/0048737 | A1 * | 12/2001 | Goldberg et al. | 379/114.13 |
| 2003/0076940 | A1 * | 4/2003 | Manto | 379/114.05 |
| 2004/0058670 | A1 * | 3/2004 | Pohutsky et al. | 455/406 |
| 2006/0034438 | A1 * | 2/2006 | O'Neill | 379/114.07 |
| 2009/0271268 | A1 | 10/2009 | Zhao et al. | |

FOREIGN PATENT DOCUMENTS

| | | |
|---|---|---|
| CN | 1398104 A | 2/2003 |
| CN | 1472920 A | 2/2004 |
| JP | 10-210192 | 8/1998 |
| JP | 2001-127918 A | 5/2001 |
| JP | 2001-186575 A | 7/2001 |
| JP | 2007-214698 A | 8/2007 |
| WO | WO2007109969 A1 | 10/2007 |
| WO | WO2008122216 A1 | 10/2008 |

OTHER PUBLICATIONS

International Search Report for PCT/CN2009/072569 dated Mar. 25, 2010.

\* cited by examiner

*Primary Examiner* — Quoc D Tran
(74) *Attorney, Agent, or Firm* — Fay Sharpe LLP

(57) ABSTRACT

The invention concerns a method for sponsoring a communication service, wherein said communication service is made available directly, in particular to a user of said communication service, and wherein a rule, in particular applicable for charging a sponsor of said communication service, is determined dynamically.

20 Claims, 6 Drawing Sheets

METHOD, A TELECOMMUNICATION SYSTEM AND A NETWORK NODE FOR SPONSORING A COMMUNICATION SERVICE

BACKGROUND OF THE INVENTION

The invention relates to a method for sponsoring a communication service according to the preamble of claim 1, a telecommunication system for sponsoring a communication service according to the preamble of claim 8, and a network node for sponsoring a communication service according to the preamble of claim 16.

Such sponsoring of communication services is known for example from the method and system for providing an advertisement sponsored split charge prepaid service disclosed in the not pre-published Indian patent application 1838/CHE/2008.

In the method and system disclosed in the not pre-published Indian patent application 1838/CHE/2008 a subscriber to said prepaid service receives sponsorship in terms of a bonus or a discount depending on the amount of advertisement said subscriber accepts during a call. To that end the connection to a called person is not established directly but only after the subscriber accepts or refuses the sponsorship for said call. A direct connection to the called person is not possible.

Another sponsored call service is provided via collect call or free call services. In these services a sponsor pays for the whole cost for a call made to a fixed telephone number. However, there is no flexibility in terms of the sponsored amount or the recipient of the call.

SUMMARY OF THE INVENTION

The object of the invention is thus to propose a method, a telecommunication system and a network node for sponsoring a communication service, that offers the availability and flexibility required in modern communication systems.

This object is achieved by a method according to the teaching of claim 1, a telecommunication system according to the teaching of claim 8, and a network node according to the teaching of claim 16.

The main idea of the invention is to sponsor a communication service, wherein said communication service is made available directly, in particular to a user of said communication service, and wherein a rule, in particular applicable for charging a sponsor of said communication service, is determined dynamically. The advantage of this method is that on the one hand the sponsorship is very flexible in terms of amount of sponsorship and sponsored party and on the other hand said communication service is made available to said user directly e.g. without any delay or disruption e.g. by advertisement or a prompt to said user.

Advantageously a first cost for the usage of said communication service is charged at least partially to said sponsor, in particular by determining a second cost, in particular depending on said rule and said first cost. This means that the total cost for the usage of said service is billed entirely or in part to said sponsor, while not billing any cost at all or only a remainder to said user of said service. This is very advantageous e.g. in situations where said user is a subscriber to a prepaid communication service and would not be able to use or continue to use said prepaid communication service because he or she used up a prepaid credit amount.

Advantageously said rule depends on an originator or a recipient of said communication service. Thereby said sponsor sets up sponsorship only for certain uses of said communication service. For example a parent sets up sponsorship for his child e.g. for phone calls to certain phone numbers, like the parent's own phone number. Likewise an employee of a company is sponsored by his company or another employee of the same company.

Advantageously the invention enables to add an advertisement to said communication service. Thereby said sponsor profits from sponsoring said user, e.g. by adding an advertisement e.g. for a certain product sold by the sponsor to a Short Message Service (SMS) message sent by said sponsored user or received by said sponsored user.

Advantageously said rule is determined depending on information about said advertisement. Hence, the sponsored amount is determined flexibly depending e.g. on the sponsor, or the size of the advertisement sent to said user.

Advantageously said sponsor is reimbursed at least partially, in particular by said user of said communication service, in particular by determining a third cost. Thereby said sponsor gets all or part of the sponsored amount back, as soon as said user has enough credit on his or her account. This is particularly interesting for peer sponsoring in a prepaid communication service, where a first peer sponsors a second peer e.g. in case the second peer used up all his or her prepaid credit. The sponsoring first peer is reimbursed automatically after the second peer recharged his or her prepaid credit.

Advantageously said rule depends on information about the location of said user of said communication service. This way the use of said communication service from or to a certain geographic location is sponsored. For example a government agency sponsors all calls from a certain geographic area of a country.

BRIEF DESCRIPTION OF THE DRAWINGS

In the following the invention will be explained further making reference to the attached drawings.

DETAILED DESCRIPTION OF THE INVENTION

Figure 1:
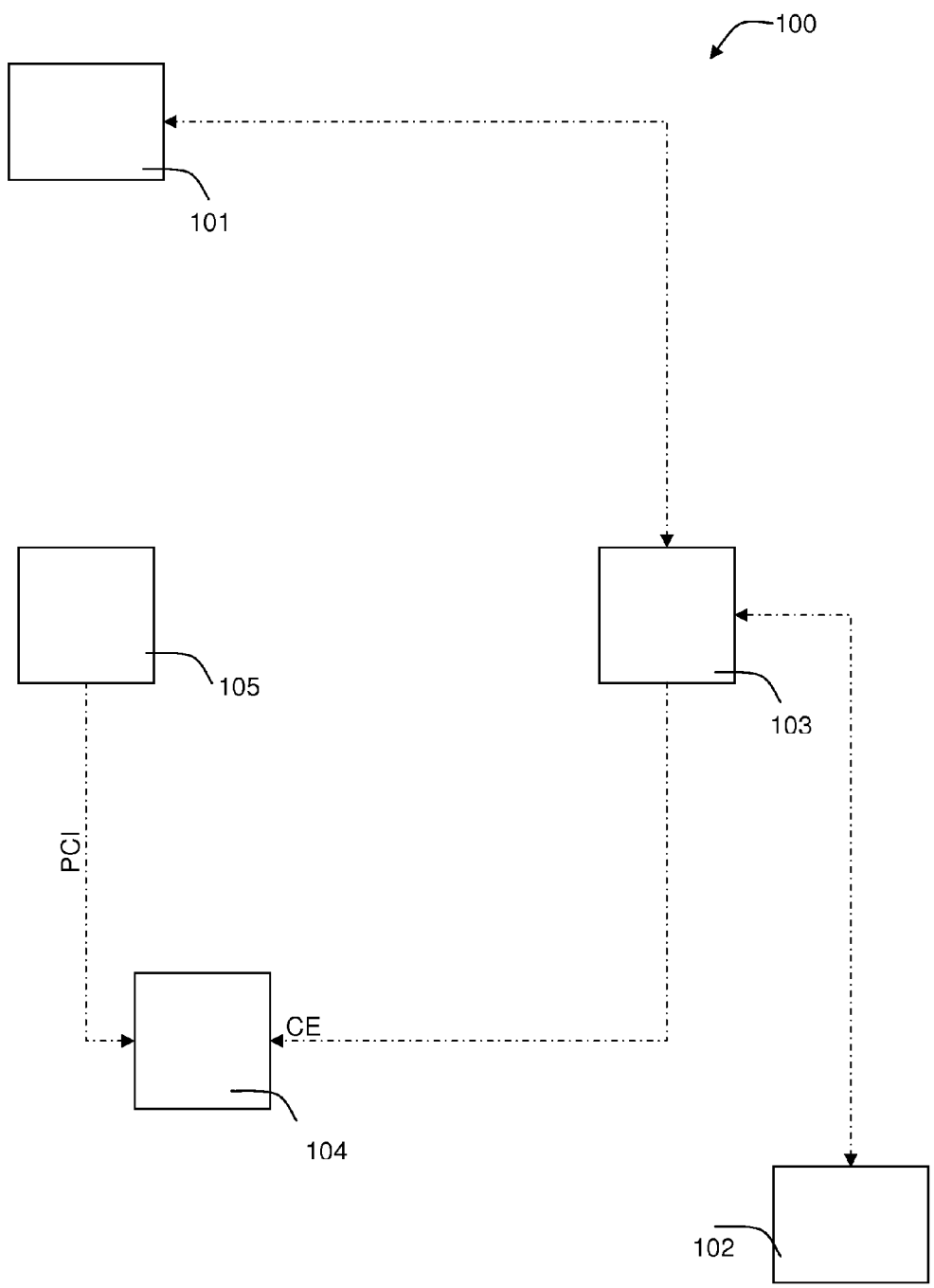
FIG. 1 schematically shows a first part of a first telecommunication system, FIG. 2 schematically shows a second part of said first telecommunication system.

FIG. 1 schematically shows a first part of a telecommunication system. Said telecommunication system 100 comprises a first user device 101, e.g. a first cellular phone or a first fixed line phone, and a second user device 102, e.g. a second cellular phone or a second fixed line phone, that are connected to a communication means 103, e.g. a next generation networks (NGN), referred to as telecommunications network 103 below.

At least a part of said telecommunications network 103 is operated by a first service provider and comprises for example links and nodes arranged so that a communication service offered by said first service provider may be passed from one part of the network to another over multiple links and through various nodes.

Said telecommunications network 103 further comprises for example switches adapted to be configured so that said communication service may be passed from said first user device 101 to said second user device 102 or vice-versa.

Additionally said telecommunications network 103 comprises for example measuring means, e.g. said switches that are adapted to determine, e.g. measure, first information about said communication service. Such measurements are for example charging events CE containing said first information. Charging events CE can be a set of charging information forwarded by the network/switching towards billing systems or prepaid systems. More specifically, for prepaid charging, the signalling protocol can be intelligent network application protocol (INAP, e.g. CS-1, CAMEL or IS-826 protocol), Diameter protocol, LDAP or XML protocol.

The following not exhaustive list gives possible contents of an exemplary charging event CE:
 A first identifier of an originator of said communication service, e.g. the local, national or international phone number of a caller or a called party,
 A second identifier of a recipient, e.g. the local, national or international phone number of a caller or a called party,
 A third identifier that is unique for said communication service, e.g. a message identifier,
 A type of service, e.g. voice, SMS, MMS, data, content,
 A user location, e.g. geographic area or radio cell of originator or recipient of said communication service,
 A direction of said communication service, e.g. outgoing call or SMS, incoming call or SMS, roaming call or SMS,
 A time information, e.g. day of week, time of day, or
 A payment type, e.g. prepaid, post-paid.
 Any other information available about said communication service, said telecommunications network or a user or a sponsor of said communication service can be part of said first information e.g. said charging event CE as well.

The invention is not limited to measurements in form of charging events CE. If said first information about said communication service is obtained differently, e.g. by means of call data records, event data records or a dedicated signalling protocol, the invention can be applied likewise. For the sake of clarity said first information about said communication service is referred to as charging event CE below.

As shown in FIG. 1, said charging event CE and a second information PCI are provided to a billing centre 104 by said telecommunications network 103 and a customer care server 105 respectively.

Said second information PCI is determined and stored in said customer care server 105 and referred to below as product and customer information PCI. Said product and customer information PCI is for example stored by a customer service representative when a first user of said first user device 101 establishes a service contract about the use of said communication service with said service provider.

Said product and customer information PCI on the one hand includes for example personal information about said first user like billing address or account to bill. On the other hand said product and customer information PCI includes information about the communication service subject to said service contract, for example rates.

Figure 2:
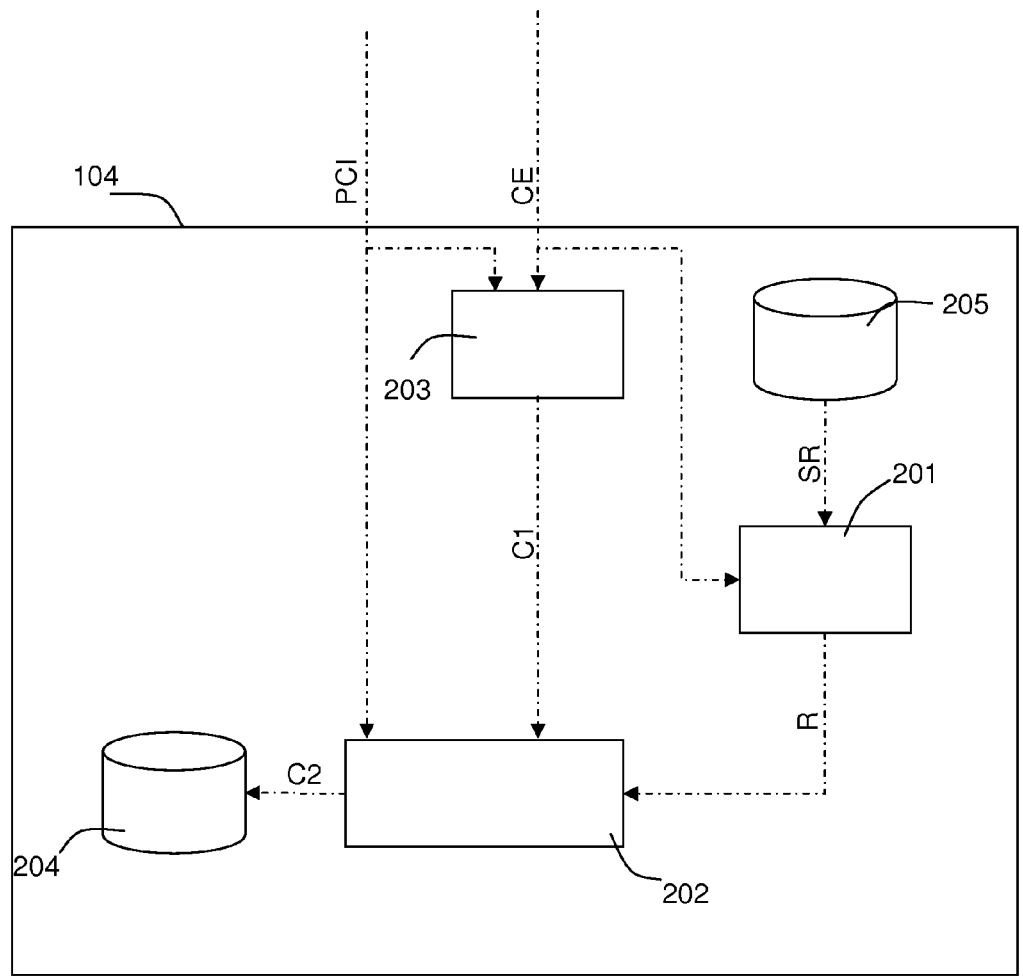

FIG. 2 schematically shows said billing centre 104 according to said first embodiment, comprising a first processing means 201 that receives said charging event CE. Said first processing means is referenced as balance management server 201 below.

Furthermore as shown in FIG. 2, said billing center 104 comprises a second processing means 202, a rating server 203, a first storage means 205 and a second storage means 204. For the sake of clarity said second processing means 202, said first storage means 205 and said second storage means 204 are referred to as charging server 202, billing pool 204 and sponsorship database 205 respectively below.

Said sponsorship database 205 contains at least one sponsorship rule SR that defines the terms of sponsorship between a sponsor and said first user for example depending on:
 A fourth identifier of an originator of said communication service, e.g. the local, national or international phone number of said first user device 101,
 A fifth identifier of a recipient of said communication service, e.g. the local, national or international phone number of said second user device 102,
 A type of service, e.g. voice, SMS, MMS, data, content,
 A user location, e.g. geographic area or radio cell for example of said first user device 101 or said second user device 102,
 A direction of said communication service, e.g. outgoing call or SMS, incoming call or SMS, roaming call or SMS,
 A third information about the time said communication service is requested or provided, e.g. day of week, time of day,
 A payment type, e.g. prepaid, post-paid, or
 A priority information with respect to other sponsorship rules SR.

The list given above is not exhaustive. Additionally or alternatively said at least one sponsorship rule SR can for example also depend on any other information available about said communication service, said user, said sponsor or said telecommunications network 103.

For example said at least one sponsorship rule SR reflects the parties bound by and the terms of a business agreement. The sponsorship rule SR, for example contains information about who sponsors, who is sponsored, and what type of service is sponsored. This information is used for example to decide which user and which type of service is sponsored, and to find said sponsor.

Additionally said sponsorship rule SR contains a rule R for determining the amount that is sponsored by said sponsor. For example, in case said sponsor agrees to pay at least partially for the use of said communication service by said user, said rule R defines, how an amount to charge to said sponsor is determined. For example said sponsor agrees to pay for example 10% of a first cost C1 of said use of said communication service. In this case said rule R defines that said sponsor is charged 10% of said first cost C1. Said rule R is for example defined using a first value s containing information about said sponsor, e.g. an account number of said sponsor, and a second value r, containing a percentage to be charged to said sponsor, for example:

$$R=(s,r),$$

for example with r=*0.1 for a 10% sponsoring.

For the sake of clarity, said first cost C1 is referred to as total cost C1 below.

Said at least one sponsorship rule SR is for example entered by said sponsor or said customer service representative into said sponsorship database via a Web-interface adapted to access said sponsorship database 205.

Said total cost C1 is determined for example in terms of credit by said rating server 203, i.e. money in a currency applicable to the country of the service provider's location. The invention is not limited to monetary costs, but is likewise applied to billing systems adapted to charging costs differently, for example using credit points.

To determine said total cost C1 said rating server 203 receives said charging event CE and said product and customer information PCI. Said total cost C1 is for example determined depending on said charging event CE and said product and customer information PCI according to a telecommunications rating method. Such telecommunication rating methods are well known to a person skilled in the art, e.g. from the 3GPP standard, and not described further here.

Said total cost C1 is sent from said rating server 203 to said charging server 202. Alternatively said rating server 203 and said charging server 202 are combined as a billing server. In this case the inventive method is applied likewise.

Additionally said charging server 202 receives said rule R from said balance management server 201. Said charging server 202 determines a second cost C2 depending on said rule R. For sake of clarity said second cost C2 is referred to as sponsor's cost C2 below.

Said charging server 202 determines said sponsor's cost C2 for example depending on said total cost C1. For example according to said rule R a percentage r of said total cost C1 will be charged to said sponsor. In that case the sponsor's cost C2 is for example calculated depending on the product of rule R and total cost C1, for example as follows:

$$C2=C1*r.$$

In case no rule R is available, for example because said use of said communication service is not sponsored, said sponsor's cost C2 is Zero.

Said sponsor's cost C2 is for example send to said billing pool 204 for example to be billed to said sponsor according to a telecommunications billing method well known to the person skilled in the art, e.g. according to 3GPP standard.

The setup of said billing center 104 is exemplary with respect to the components included in said billing center 104. Said processing means and said storage means can be located outside of said billing center 104, decentralized for example in several parts of said telecommunications network 103. The invention covers such setups as well.

Said balance management server 201 determines said rule R dynamically depending on said at least one sponsorship rule SR.

According to a first embodiment of said invention, said rule R is determined depending on said originator or said recipient of said communication service. Therefore said at least one sponsorship rule SR is defined depending on information about said originator or said recipient. Additional information about said communication service can be added, but is not required. This reduces the amount of data that needs to be stored in said sponsorship database 204 and enables a very efficient way of sponsoring.

For example if said sponsor decides to sponsor the usage of said communication service originating from said first user device 101, said at least one sponsorship rule SR is defined as a mapping of said fourth identifier to said rule R, for example:

$$SR=(\text{fourth identifier}\rightarrow\text{rule }R).$$

Said rule R contains for example said first value s referencing said sponsor, e.g. said account number, and said second value r, e.g. r=*0.1, indicating said percentage of said total cost C1 that is to be charged to said sponsor.

Figure 3:
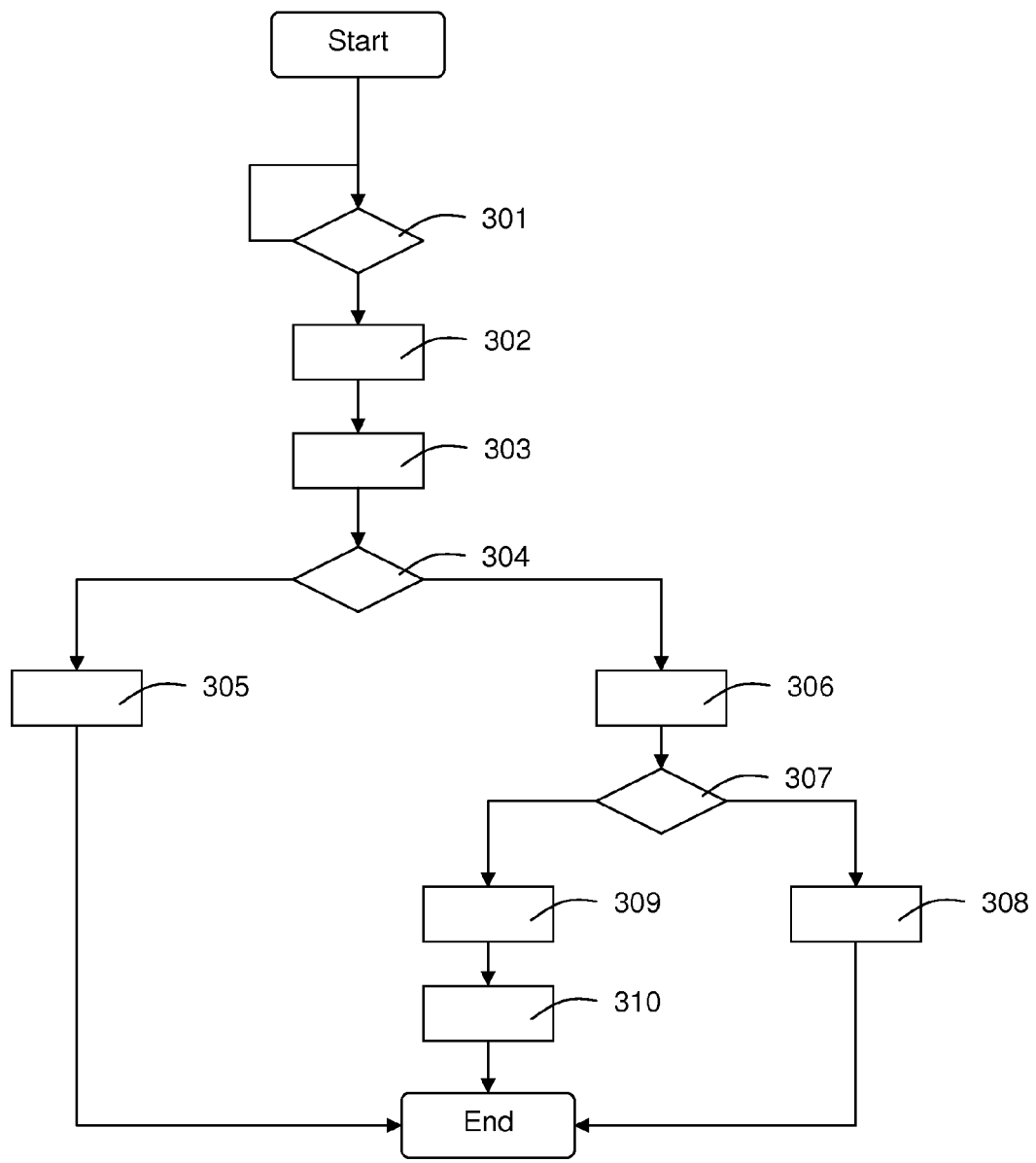
FIG. 3 shows a first flowchart, FIG. 4 schematically shows a third part of a second telecommunication system, FIG. 5 schematically shows a fourth part of said second telecommunication system.

FIG. 3 shows a first flowchart of a method according to said first embodiment of the invention. The method starts as soon as an charging event CE for example from a phone call made by said first user operating said first user device 101, is received by said billing center 104. Techniques for making said communication services available directly and for recording and sending said charging event CE to said billing center 104 are well known to a person skilled in the art for example from fixed line telecommunications systems or next generation networks.

After the start a step 301 is executed.

In step 301 a test is performed to determine whether said charging event CE is received. If said charging event CE is received, a step 302 is executed. Otherwise said step 301 is executed again to continue waiting for said charging event CE.

In step 302 said total cost C1 is determined according to a telecommunications rating method, for example depending on said charging event CE or said product and customer information PCI. Afterwards a step 303 is executed.

In step 303 said rule R is determined dynamically. Said rule R is determined for example by firstly extracting said first identifier from said charging event CE and secondly by searching said at least one sponsorship rule SR that maps said first identifier to said rule R. For example by finding said at least one sponsorship rule SR in which said fourth identifier is included and matches said first identifier. If no sponsorship rule SR is found, said rule R is set to be invalid, for example by setting said first value s to Zero. Afterwards a step 304 is executed.

In step 304 a test is performed to determine whether said rule R was determined. If said rule R was determined, e.g. said constant s is not equal to Zero, said sponsor is found and a step 306 is executed. Else said sponsor is not found and a step 305 is executed.

In step 305 a billing procedure according to said telecommunications billing method for service without sponsorship is performed to determine said total cost C1. Such telecommunications billing methods are well known to persons skilled in the art and not explained further. Afterwards the method ends.

In step 306 said sponsor's cost C2 is determined, for example by applying said rule R to said total cost C1. For example said rule R is defined as pair of data, containing said first value s referencing said sponsor, and said second value r, e.g. r=*0.1, defining e.g. said percentage of said total cost C1 that is to be charged to said sponsor. In this case said second cost C2 is calculated as follows:

$$C2=C1*r.$$

Afterwards a step 307 is executed.

In step 307 a test is performed to determine whether said second cost C2 is equal to said total cost C1. If said second cost C2 is equal to said total cost C1, the sponsor will be charged for the entire total cost C1 and a step 308 is executed. Otherwise, a step 309 is executed.

In said step 308 said sponsor's cost C2 is added to said billing pool 204, e.g. by saving said sponsor's cost C2 and said first value s according to said known telecommunications billing method. Afterwards the method ends.

In step 309 a third cost C3 is determined. For the sake of clarity said third cost C3 is referred to as user's cost C3 below. Said user's cost C3 is for example determined depending on said total cost C1, said sponsor's cost C2 or said rule R.

For example said user's cost C3 is calculated depending on the difference between said total cost C1 and said sponsor's cost C2 for example as follows:

$$C3=C1-C2.$$

Afterwards step 310 is executed.

In step 310 said user's cost is added to said billing pool 204, e.g. by saving said user's cost C3 and said first identifier according to said known telecommunications billing method.

Said first identifier is determined from said charging event CE. Afterwards the method ends.

The generation of invoices for and sending of said invoices to said user or said sponsor is for example done by means of said known telecommunications billing method and not explained further here.

The invention is not limited to any specific type of service, end user device or telecommunications network. Furthermore said method is likewise applied to prepaid or post-paid communication services. For post-paid communication services the method according to the invention is started for example after said use of said communication service finished. For prepaid communication services the method according to the invention is for example started every time a new billing period starts.

In case said communication service is a prepaid communication service, said at least one sponsorship rule SR is for example set up to allow said first user to use or continue to use said prepaid communication service even if his or her own prepaid credit is not enough to cover said first cost C1 for said prepaid communication service. This way for example a government agency could enable all prepaid users to continue to make phone calls for example in case of an emergency situation.

To that end, the method according to said first embodiment is amended to comprise an additional step for testing if said user has enough prepaid credit PC left. Said additional step is not shown in the flowchart of FIG. 3 and executed between steps 304 and 306 of the flowchart of FIG. 3. All other steps are the same as the steps of said method according to said first embodiment.

If said user has enough prepaid credit left, said step 305 is executed to perform regular prepaid billing, according to well known telecommunications prepaid billing methods. Otherwise said sponsor's cost C2 is calculated in said step 306.

In this case said step 306 is modified to additionally use information about said prepaid credit that is still left to said user. Said sponsor's cost is, for example determined depending on the difference of said total cost C1 and said prepaid credit PC, for example as follows:

$$C2=C1-PC.$$

Further modifying said sponsorship rule SR and said step 306, a parent can act as a sponsor and set up sponsorship for his child only for calls made from the child to recipients defined by the parent. Or a company or a company employee can sponsor one employee for calls made from said employee's phone to other employees of said company.

To that end said fifth identifier, i.e. information about the receiving party, for example the phone number of said recipient is included into said sponsorship rule SR. Then in said step 306 said second identifier, identifying said recipient of said communication service is extracted. Then an additional search is performed to find said at least one sponsorship rule that contains said fifth identifier matching said second identifier.

Figure 4:
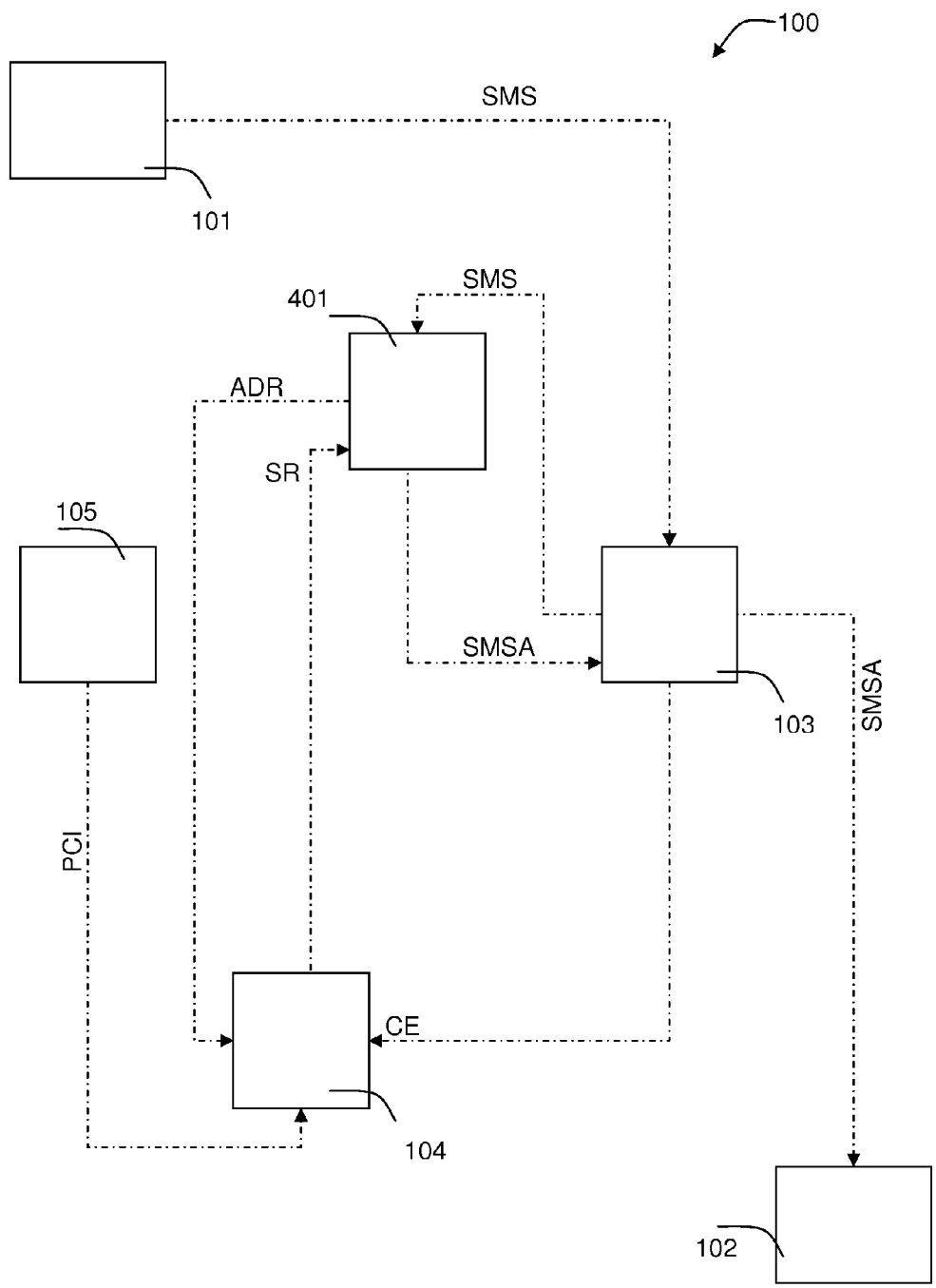

A second embodiment of said invention is shown schematically in FIG. 4.

Said second embodiment is based on said first embodiment of the invention and the structure is similar to that of the first embodiment described in FIG. 1. Therefore corresponding reference signs are used for corresponding elements in FIG. 4.

According to FIG. 4 an additional third processing means 401 is connected to said telecommunications network 103. For the sake of clarity said fourth processing means 401 is referred to as advertisement server 401 below.

According to said second embodiment, only unidirectional communication services SMS are sent from said first user device 101 to said second user device 102. Such unidirectional communication services SMS include but are not limited to short messaging service messages.

Furthermore said telecommunications network 103 is set up to redirect said unidirectional communication service SMS via said advertisement server 401. Methods for such redirection are well known to a person skilled in the art and not further described here.

Said advertisement server 401 analyses said unidirectional communication service SMS to determine whether said unidirectional communication service SMS is eligible for sponsoring.

Said unidirectional communication service SMS is eligible for sponsoring, if said sponsorship database 205 contains at least one sponsorship rule SR that applies to said unidirectional communication service SMS.

If for example said unidirectional communication service SMS, e.g. a short message service message, is sent from said first user device 101 to said second user device 102, said unidirectional communication service SMS contains said first identifier, which identifies said originator and said second identifier which identifies said recipient of said unidirectional communication service SMS. Additionally said unidirectional communication service SMS contains said third identifier, for example said message identifier.

Said advertisement server 401 extracts said first identifier from said unidirectional communication service SMS and looks up said at least one sponsorship rule SR, by finding said at least one sponsorship rule that contains said fourth identifier matching said first identifier. Therefore said advertisement server 401 is connected for example via a data link to said sponsorship database 205.

If at least one sponsorship rule SR is found, said unidirectional communication service SMS is sponsored, and said advertisement server adds an advertisement to said unidirectional communication service SMS to create a modified communication service SMSA. Said advertisement depends for example on said sponsorship rule SR, in particular on said first value s, referencing said sponsor. The advertisement server 401 looks up said advertisement for example in an advertisement database that maps said first value s to said advertisement. Said advertisement database is for example configured by said sponsor before said service is offered.

Said modified communication service SMSA is then sent to said second user device 102.

Alternatively unidirectional communication services SMS sent to said first user device 101 are redirected in the same way to said advertisement server 401 and a modified communication service SMSA is sent to said first user device 101.

Said advertisement server 401 keeps an advertisement data record ADR, which contains for example the at least one sponsorship rule SR, said first identifier and said third identifier. Said advertisement data record ADR is sent to said billing center 104 via a second data.

The set up of the billing center 104 according to said second embodiment of the invention is for example based on the setup depicted in FIG. 2.

Additionally or alternatively to said charging event CE the balance management server 201 according to said second embodiment receives said advertisement data record ADR. Both are stored for example temporarily in a volatile storage means for further processing.

The method according to said second embodiment is based on the method according to said first embodiment depicted in FIG. 3.

In an additional step that is executed between steps 302 and 303 a test is performed to determine whether an advertisement data record ADR matching said charging event CE has been received. For example a match is found, if said third identifier is contained in said charging event CE and said advertisement data record ADR. If a match is found, step 303 is executed. Otherwise a waiting procedure is started, to wait for the advertisement data record ADR. If no matching advertisement data record ADR is received within a predetermined period of time, said waiting procedure is stopped and step 303 is executed.

According to said second embodiment step 303 of said first embodiment is modified to determine said rule R depending on said advertisement data record ADR. Said rule R is for example determined from said at least one sponsorship rule SR contained in said advertisement data record ADR. If no advertisement data record ADR is available, said rule R is determined according to the method of said first embodiment.

All other steps are the same as the corresponding steps of said first embodiment.

The first embodiment and the second embodiment apply to prepaid communication services as well as post-paid communication services.

In a third embodiment of said invention said sponsor sponsors a prepaid communication service for said user in case a balance B, e.g. a credit left on a prepaid account, is equal or less than a predetermined first threshold, e.g. Zero. The sponsor then is reimbursed for said sponsorship by means of charging at least a part of said sponsor's cost C2 to said user, after said balance B is more than a predetermined second threshold, e.g. said user reloaded his prepaid account.

Said third embodiment of the invention is based on the method according to said first embodiment or said second embodiment, hence all steps for determining said rule R, said total cost C1, said sponsor's cost C2 as well as the storage of said sponsor's cost C2 are equivalent to the steps of aforementioned methods.

Figure 5:
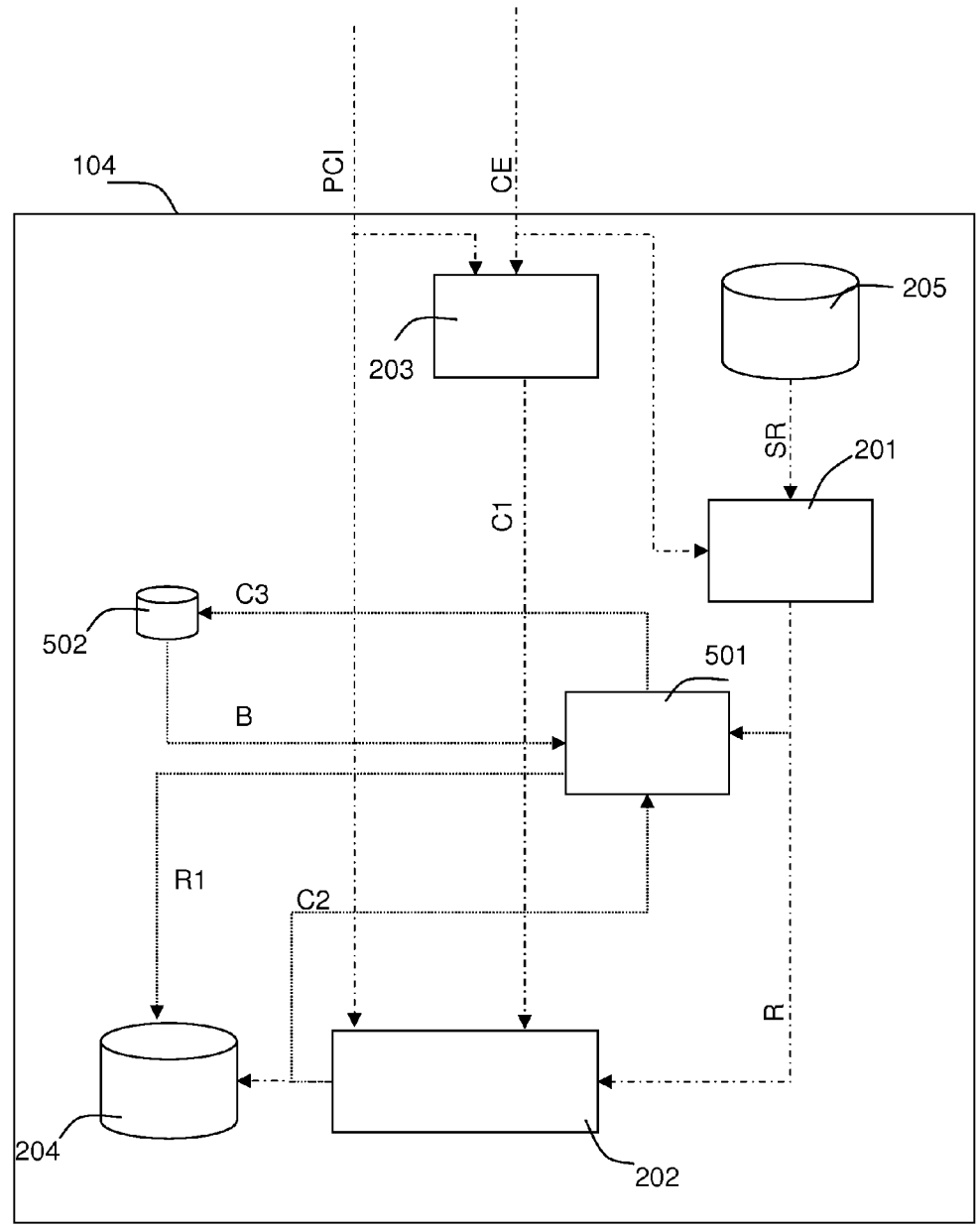

As depicted in FIG. 5, the telecommunication system and network node according to said third embodiment contain additionally a fourth processing means 501 and a third storage means 502 for storing said balance B.

As depicted in FIG. 5, the fourth processing means 501 receives said rule R from said balance management server 201, said second cost C2 from said charging server 202 and said balance B from said third storage means 502.

This means that said balance B resembles for example an accumulation of said third cost C3 charged to said user and payments from said user received by said billing center 104.

Said fourth processing means requests or receives said balance B for said user frequently for example via a data link.

Said rule R according to said third embodiment contains additionally information about the fact that the sponsorship rule SR defined that the sponsor is to be reimbursed. Said rule R for example contains a flag F that has the value 1 in case reimbursement is required and the value 0 otherwise.

In case said flag F equals to one, said fourth processing means 501 starts said reimbursement. A method for reimbursing is shown in the flowchart of FIG. 6 and the description below.

Figure 6:
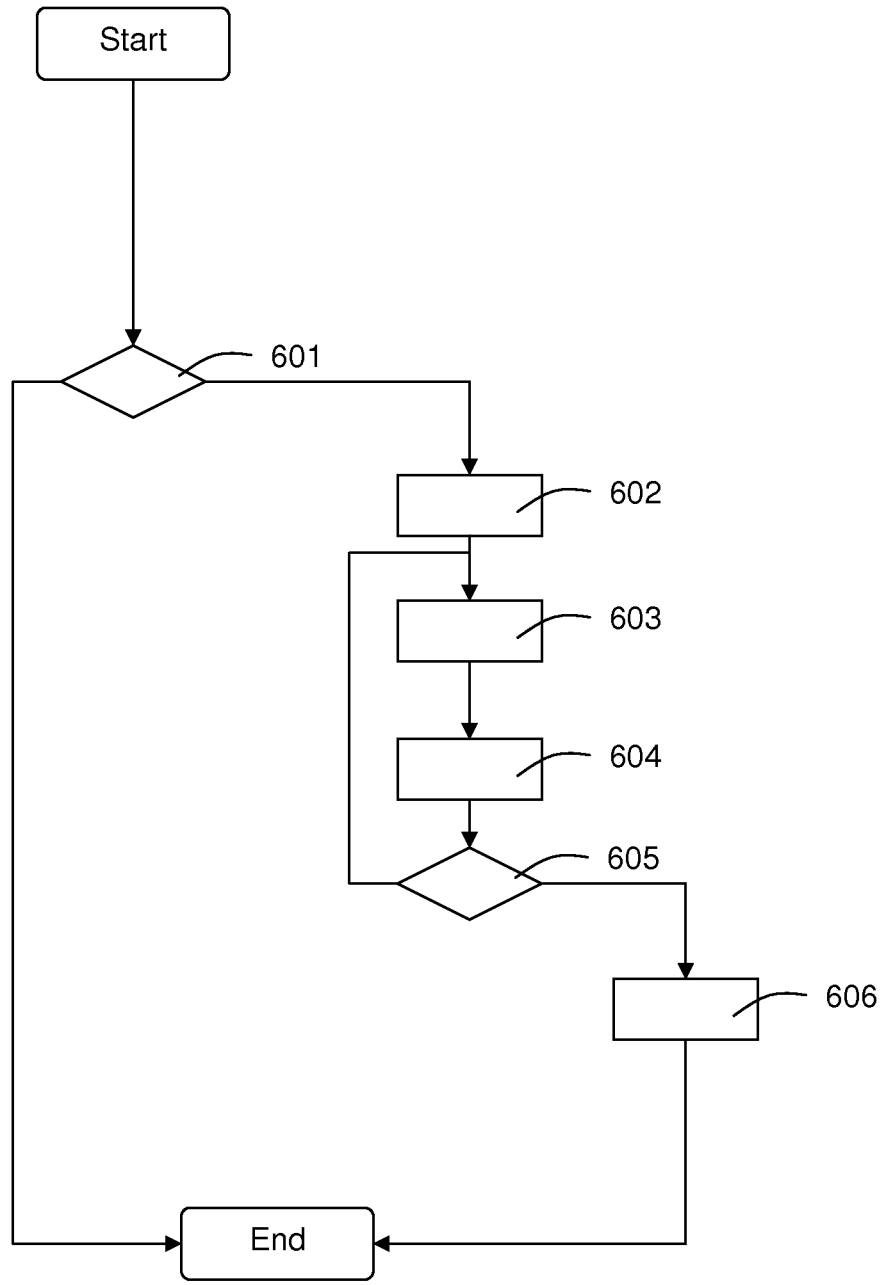
FIG. 6 shows a second flowchart.

The method according to said third embodiment contains additional steps shown in FIG. 6 and is started as soon as said rule R is received by said fourth processing means 501.

If said rule R was received, a step 601 is executed.

In step 601 a test is performed to determine whether said flag F received with said rule R equals to one. If said flag F equals to one, a reimbursement is required and a step 603 is executed. Otherwise the method ends.

In step 602 said second cost C2 is received and stored for example in a volatile memory. In case said second cost C2 is not received immediately a wait routine is started until said second cost C2 is received. Afterwards a step 603 is executed.

In step 603 said balance B is received. In case said balance B is not received immediately another wait routine is started until said balance B is received. Afterwards a step 604 is executed.

In step 604 said reimbursement R1 and said user's cost C3 are determined depending on said second cost C2. For example said reimbursement R1 is calculated depending on the difference between said second cost C2 and said balance B and said user's cost depending on said reimbursement, for example as follows:

$$R1=C2-B,$$

$$C3=R1.$$

Afterwards a step 605 is executed.

In step 605 a test is performed to determine whether said reimbursement R1 is greater than a third threshold, for example greater than Zero. In case said reimbursement R1 is greater than said third threshold said user has enough credit on his prepaid account to perform reimbursement and a step 606 is executed. Otherwise the step 603 is executed.

In step 606 said reimbursement R1 is stored as credit for said sponsor to said billing pool 204. Furthermore said user's cost C3 is charged to said user by sending it to said third storage means 502. Said balance B is updated at the same time. Afterwards the method ends.

Another embodiments of said invention include sponsorship rules SR that allow said balance management server 201 to determine a sponsored usage of said service by means of location of said user. To that end said balance management server 201 is adapted to determine said location for example from said first identifier, e.g. the phone number of the first user device 101 used by said user. This is particularly advantageous in case a government agency acts as sponsor for example for all phone calls made from a certain geographic area.

Also said at least one sponsorship rule can be used to enable said service provider to charge for example higher costs to said sponsor, than to said user, for example to cover the cost of said service provider for providing said sponsorship service.

Several of said at least one sponsorship rule SR mentioned above can be combined in many ways flexibly to create new sponsorship rules.

What is claimed is:

1. A method for sponsoring a communication service, the method comprising:
   receiving a request for communication services;
   accessing, dynamically, a rule for charging a sponsor of said communication services at least a portion of total charges for the requested communication services based on a plurality of parameter values including at least one respective value of at least one respective parameter other than an identity of an originator of the request for communication services, an intended recipient of a communication of the requested communication services and an identity of the sponsor;
   providing said communication service, to a user of said communication service, directly; and
   generating a charging record for charging the sponsor according to the rule.

2. The method of claim 1, wherein a first cost for the usage of said communication service is charged at least partially to said sponsor, by determining a second cost, the second cost depending on said rule and said first cost.

3. The method of claim 1, wherein said rule depends on the originator of the request or the intended recipient of said communication.

4. The method of claim 1, wherein an advertisement is added to said communication service.

5. The method of claim 4, wherein said rule is determined depending on information about said advertisement.

6. The method of claim 1, wherein said sponsor is reimbursed at least partially, by a user of said communication service, by determining a third cost.

7. The method according to claim 1, wherein said rule depends on information about the location of a user of said communication service.

8. A system for sponsoring a communication service, comprising:
a telecommunications network for making said communication service available directly, to a user of said communication service, and
a balance management server for dynamically determining a rule for charging a sponsor of said communication service at least a portion of total charges for the requested communication services based on a plurality of parameter values including at least one respective value of at least one respective parameter other than an identity of an originator of the request for communication services, an intended recipient of a communication of the requested communication services and an identity of the sponsor.

9. The system of claim 8, further comprising:
a charging server for charging a first cost for the usage of said communication service at least partially to said sponsor, by determining a second cost, the second cost depending on said rule and said first cost.

10. A device for sponsoring a communication service, comprising:
a balance management server for dynamically determining a rule for charging a sponsor of said communication service at least a portion of total charges for the requested communication services based on a plurality of parameter values including at least one respective value of at least one respective parameter other than an identity of an originator of a request for communication services, an intended recipient of a communication of the requested communication services and an identity of the sponsor.

11. The device of claim 10, further comprising a charging server for charging a first cost for the usage of said communication service at least partially to said sponsor, by determining a second cost, the second cost depending on said rule and said first cost.

12. The device of claim 10, wherein said balance management server is configured to determine an originator of the request or an intended recipient of said communication, and wherein said balance management server is configured to determine said rule depending on said originator of the request or said intended recipient of said communication.

13. The device of claim 10 further comprising a sponsorship database for storing said rule.

14. The device of claim 10, further comprising an advertisement server for adding an advertisement to said communication service.

15. The device of claim 14, wherein said balance management server is configured to determine said rule depending on information about said advertisement.

16. The device of claim 10, further comprising a fourth processor for reimbursing said sponsor, in particular by a user of said communication service by determining a third cost.

17. The device according to claim 10, wherein said balance management server is configured to determine information about a location of a user of said communication service, and wherein said balance management server is configured to determine said rule depending on said location of said user.

18. A non-transient computer readable medium comprising:
instructions for a computer which when executed by a computer, causes the computer to:
make a communication service available directly, to a user of said communication service, and
to dynamically determine a rule for charging a sponsor of said communication service at least a portion of total charges for the communication service based on a plurality of parameter values including at least one respective value of at least one respective parameter other than an identity of an originator of a request for the communication service, an intended recipient of a communication of the requested communication service and an identity of the sponsor.

19. A computer program product for sponsoring a communication service, comprising:
a non-transient computer readable medium having instructions which, when executed by a computer, causes the computer to make a communication service available directly, to a user of said communication service, and to dynamically determine a rule, for charging a sponsor of said communication service at least a portion of total charges for the communication service based on a plurality of parameter values including at least one respective value of at least one respective parameter other than an identity of an originator of a request for the communication service, an intended recipient of a communication of the requested communication service and an identity of the sponsor.

20. The method of claim 1 wherein the at least one respective parameter comprises at least one of a user location, a type of service, a direction of service, time information, a payment type and rule priority information.

* * * * *